United States Patent [19]

Marinoza

[11] Patent Number: 4,534,282

[45] Date of Patent: Aug. 13, 1985

[54] PROCESS AND APPARATUS FOR TREATING FOOD PRODUCTS

[76] Inventor: René A. Marinoza, 8220 - 8th Ave., St. Francois, Quebec, Canada, H7A 1H1

[21] Appl. No.: 374,906

[22] Filed: May 4, 1982

[51] Int. Cl.³ .............................................. A23C 3/00
[52] U.S. Cl. ...................................... 99/451; 99/453; 99/483; 210/764; 422/24
[58] Field of Search ................. 99/452, 451, 453, 455, 99/483, 516, 536; 422/24; 250/437, 435; 210/748, 764; 426/248, 519-522

[56] References Cited

U.S. PATENT DOCUMENTS

| 3,700,406 | 10/1972 | Landry | 422/24 |
| 4,230,571 | 10/1980 | Dadd | 422/24 |
| 4,274,970 | 6/1981 | Beitzel | 422/24 X |

FOREIGN PATENT DOCUMENTS 1048733  2/1979  Canada .................. 422/24

Primary Examiner—Timothy F. Simone

[57] ABSTRACT

There are disclosed an apparatus for pasteurizing and/or sterilizing food products by exposing the latter to electro-magnetic radiations, namely: infra-red radiation for pasteurization and ultra-violet radiations for sterilization. The apparatus enables continuous treatment of the food products.

6 Claims, 10 Drawing Figures

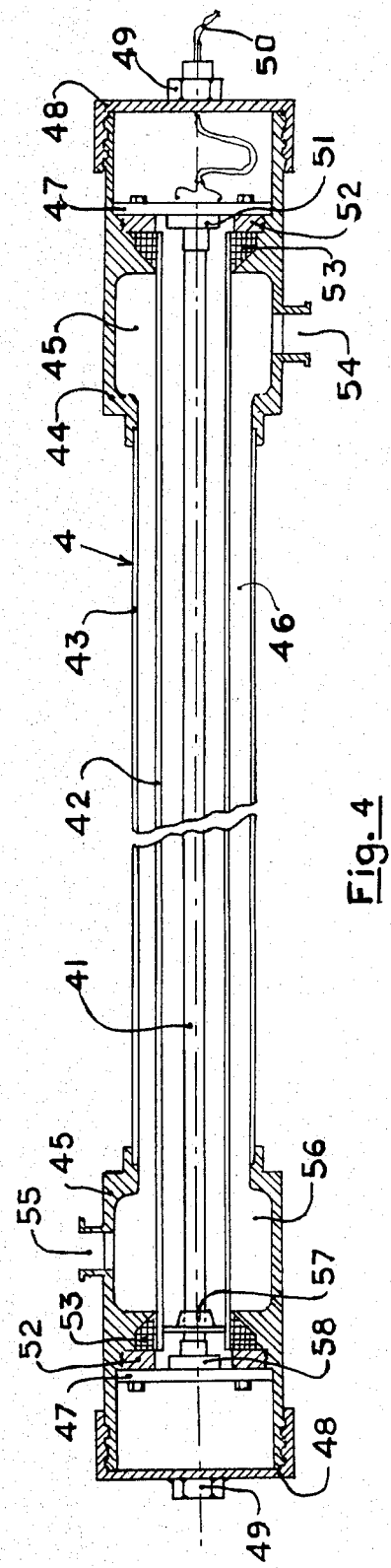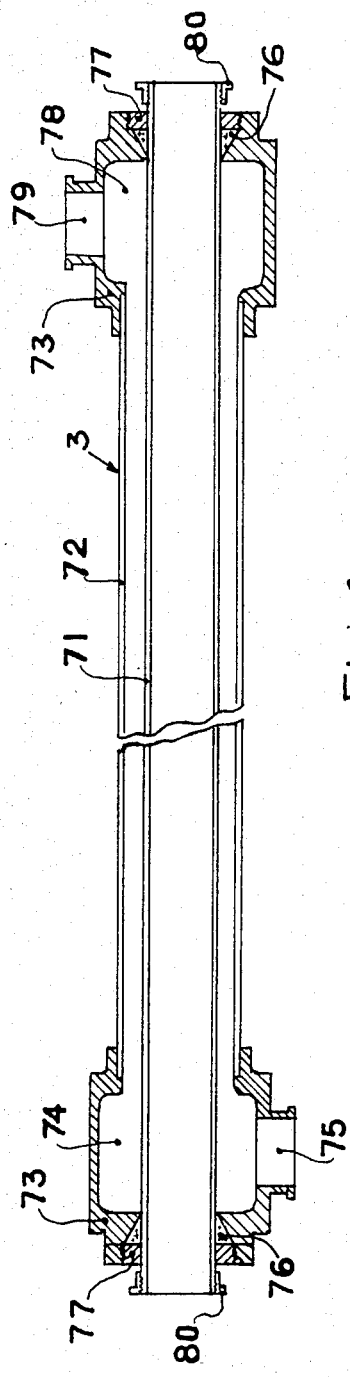

PROCESS AND APPARATUS FOR TREATING FOOD PRODUCTS

The present invention relates to the treatment of flowable food products for at least partially sterilizing of the same.

BACKGROUND OF THE INVENTION

Conventional pasteurizing method uses plate heat exchangers, where the transmission of heat is carried out through a surface that is heated to a temperature far above the temperature required to obtain the proper heat treatment. Beside being energetically very inefficient, this method is causing many problems to the users, such as off-flavour, browning, cooked flavor and burnt deposits on the heating surfaces. Even though pasteurization is considered as the most efficient means to conical bacteria contamination, heat-resisting bacteria are not destroyed by the pasteurizing temperatures and processing times practical for this type of method. If sterilization is required for long-time conservation, one must add chemical preservatives.

OBJECTS OF THE INVENTION

It is the general object of the present invention to provide a process and apparatus for at least partially sterilizing flowable food products, which obviate the above-noted disadvantages in that heat is instantaneously transmitted through the mass of the food product to thereby eliminate off-flavour, browning, caramelization, cooked flavour and burnt deposits on the heating surface of the conventional heat-treating system.

It is another object of the present invention to provide a heat-treating proces which is applicable to various flowable food products and, more particularly, milk and cream.

It is another object of the invention to provide an apparatus for hot-treating food products, which is compact, requires about 40% less energy than the conventional pasteurization apparatus; does not require a boiler, steam and condensate piping and other appliances, such as de-aerators, steam valves, piping insulation; and which does not require maintenance, such as adjusting and retrofitting of oil burners and re-tubing of the boiler.

Another object of the invention is to provide an apparatus of the character described, which is of simple and inexpensive construction and operation, and which can treat food products in a continuous flow.

SUMMARY OF THE INVENTION

The process in accordance with the invention consists of continuously flowing a flowable food product as a relatively thin layer, while exposed to a source of electro-magnetic radiations. For pasteurizing the food products, the source of electro-magnetic radiations is an infra-red source, while for sterilizing the product, ultra-violet radiations are used.

The apparatus in accordance with the invention comprises a treatment cell, of tubular shape, including an elongated radiation-emitting element spacedly surrounded by a tubular jacket completely transparent to the electro-magnetic radiations and in turn spacedly surrounded by an outer tube, forming with the jacket, an annular passage for the flow of the food products to be treated.

In accordance with the present invention, the apparatus further comprises a holding chamber to complete pasteurization and heat exchangers to pre-heat the food products and to recuperate the heat therefrom after treatment.

The foregoing will become more apparent during the following disclosure and by referring to the drawings, in which: dr

BRIEF DESCRIPTION OF THE DRAWINGS

FIG. 4 is a longitudinal section of an ultra-violet sterilizing cell;

FIG. 6 is a longitudinal section of a heat-exchanger module;

DETAILED DESCRIPTION OF THE INVENTION

Figure 1:
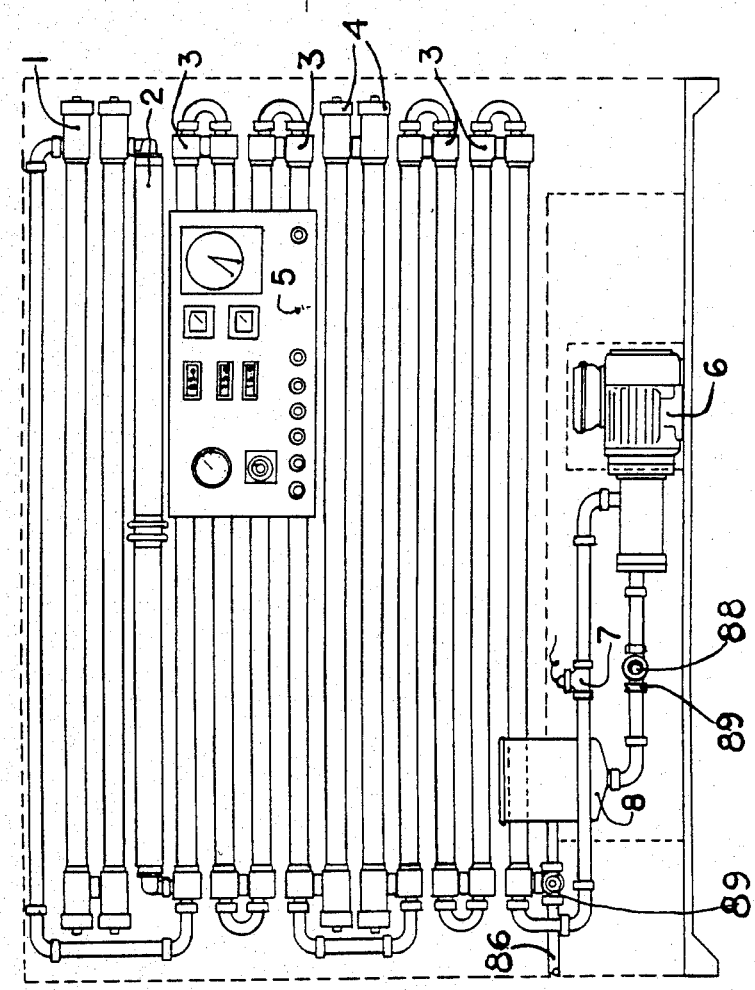
FIG. 1 is an elevation of a typical apparatus in accordance with the invention.
Figure 7:
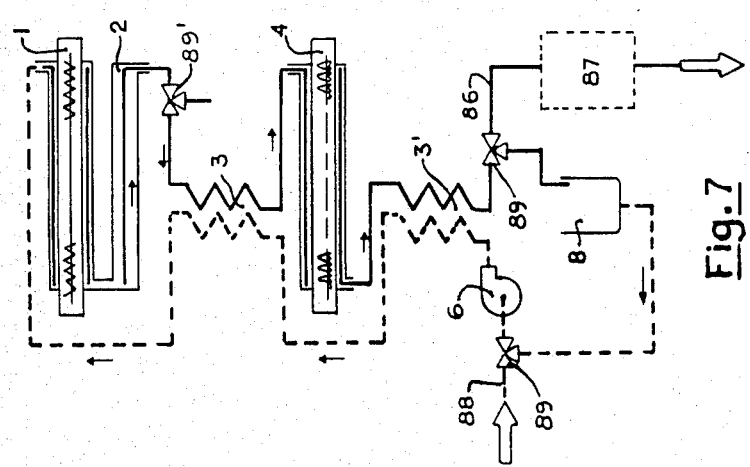
FIG. 7 is a flow diagram of a pasteurizing-sterilizing unit.

FIG. 1 shows an apparatus for pasteurizing and sterilizing a food product, such as milk. The flow diagram of the apparatus shown in FIG. 1 is illustrated in FIG. 7. The apparatus comprises one or more infra-red heating cells 1, a holding chamber 2, heat exchangers 3 and 3', an ultra-violet sterilizing cell 4, a control module 5, a volumetric pump 6 with its electric motor, a turbine flow meter 7, a receiving tank 8 and suitable piping with three-way valves 89 and 89'. The untreated food product enters at 88 and exits at 86.

In normal operation, the food product is circulated through pump 6 through one pass of heat exchanger 3' and 3, through the infra-red heating cell 1, through the holding tank 2, through the other pass of the heat exchanger 3, through the ultra-violet sterilizing cell 4, through the other pass of the heat exchanger 3' and, finally, to be discharged at 86 where it may be further cooled down by the cooling unit 87.

To start the pasteurizing and sterilizing operation, the food product is circulated for a few minutes in a closed loop through the system until the product has been heated sufficiently by the infra-red heating cell 1. For this purpose, once the system is filled with a product, the three-way valves 89 are operated so that the product will recirculate through the receiving tank 8 and back through the pump 6.

As shown in FIG. 7, a cooling unit 87 may be added to the outlet 86 if the liquid at not sufficiently cooled.

A three-way valve 89', with a discharge to a drain, may be added at the outlet of the holding chamber 2 to drain this part of the system.

Figure 2:
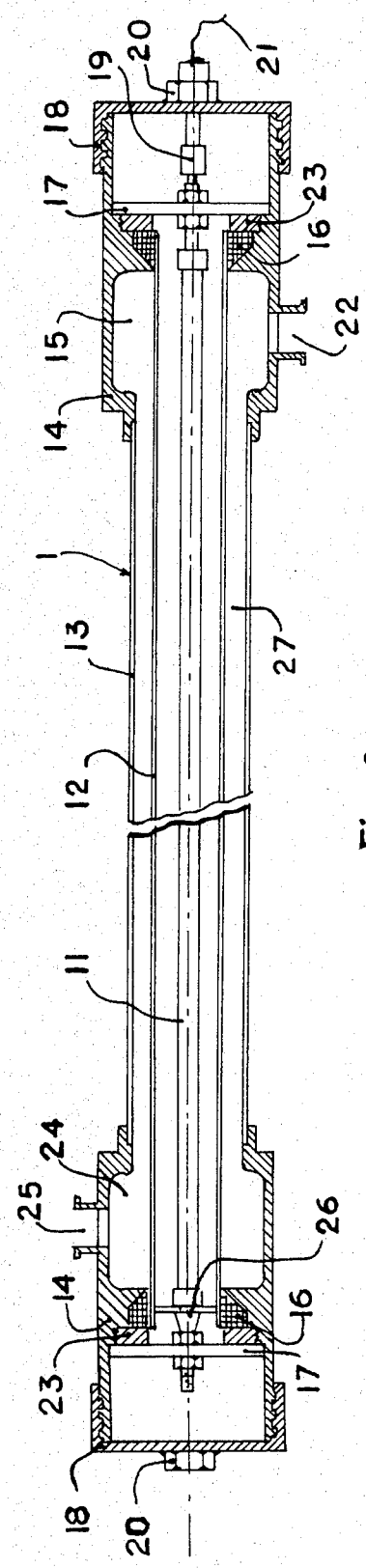
FIG. 2 is a longitudinal section of an infra-red heating cell.

One of the infra-red cells is shown in FIG. 2. It comprises an elongated infra-red radiations emiting element 11 spacedly surrounded by a tubular jacket 12, made of quartz or other material, which is completely transparent to infra-red radiations. The jacket 12 is in turn spacedly surrounded by an outer tube 13, made of metal, the interior surface of which is polished, so as to be reflective to the radiations. Two similar end cell bodies 14 hold the above-described assembly. One and cell body defines inlet chamber 15 in communication with an inlet port 22 and with the annular space 27, while the other end cell body 14 defines a similar outlet chamber 24 with an outlet port 25 and in communication with the annular space 27. End cell bodies 14 hold the infra-red element 11 by means of holding plates 17 and a support element 26. The infra-red element 11 is connected to an electrical power source by electrical socket 19 and electrical wire 21. The socket 19 is enclosed in a chamber formed by one end cell body 14 and closed by a screwed-cap 18. The cap carries a screwing head 20 for the passage of electrical wire 21. The infra-red radiations-emitting element 11 can be removed without stopping the flow of liquid in the infra-red cell.

The element 11 is completely isolated from the liquid and can be reached by removing the screwed caps 18 and the holding plates 17. The jacket 12 is sealed to both end cell bodies 14 by means of a gasket 16 held in place by a threaded compression disc 23.

The liquid or semi-liquid food product to be treated flows through the annular space 27 as a relatively thin layer, while being irradiated by the infra-red element 11. The food product is heated to the required pasteurization temperature without being exposed to heated surface, since the jacket 12, being made of quartz, does not become hot.

Figure 3:
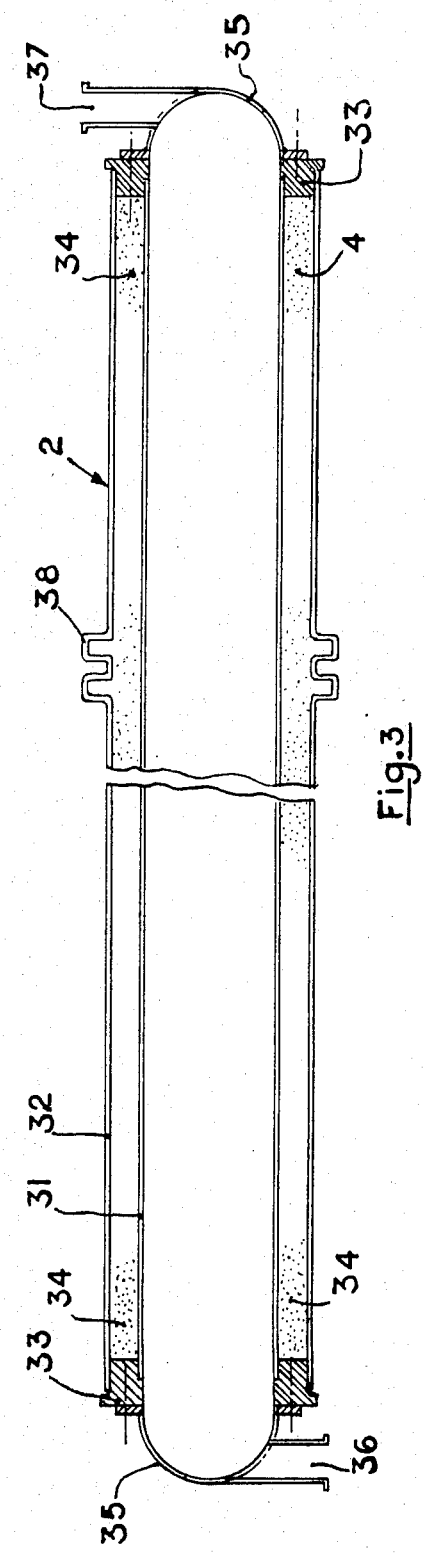
FIG. 3 is a longitudinal section of a holding chamber.

FIG. 3 is a longitudinal section of the holding chamber 2, which chamber consists of an inner shell 31 spacedly surrounded by an outer shell 32 with the interposition of insulating material 34. The ends of the two shells are fitted on end shell rings 33, which support an end casing 35. One end casing has an outlet port 36, while the end casing has an inlet port 37. The outer shell 32 is preferably provided with expansion ribs 38. The inside diameter of inner shell is of larger cross-sectional area than the cross-sectional area of the annular space 27 of he infra-red cell 1, so that the food product will slow down in the holding chamber 2 for sufficient time to allow completion of pasteurization, the food product being then at the pasteurizing temperature as obtained by exposure in the infra-red cell.

FIG. 4 illustrates the ultra-violet cell 4. This cell includes an ultra-violet radiation-emitting tube 41 spacedly surrounded by a quartz tubing, or jacket 42, completely transparent to ultra-voilet radiations. The jacket 42 is in turn surrounded by an outer tube 43, which defines with the jacket 42 an annular space 46. The jacket 42 and tube 43, together with the ultra-violet 41, are held in end cell bodies 44, of similar construction and of a construction similar to the end cell bodies 14 of the infra-red cell 1. One end cell body 44 defines inlet chamber 45 provided with an inlet port 54, while the other body 44 defines outlet chamber 55 and outlet port 55. One end of the ultra-violet tube 41 is supported by a tube socket 51 and socket bearing plate 47. The tube is connected to electrical wire 50, which extends through a screwing head 49 attached to the screwed cap 48. The other end of the ultra-violet tube 41 is supported by a tube support 57 and a tube socket 58 secured to the socket bearing plate 47. As with the infra-red cell, the ultra-violet radiation-emitting tube 41 can be removed without stopping the flow of liquid.

The tube 41 is completely isolated from the liquid and can be reached by removing the screwed caps 48 and the socket bearing plates 47. The quartz jacket 42 is sealed to the respective end cell body 44 by means of a watertight gasket 53 held in place by a threaded compression disc 52. Here again, the food to be treated which enters inlet port 54 into inlet chamber 45 will flow as a relatively thin layer through the annular space 46 to exit at 55. Since the quartz jacket 42 is completely transparent to the ultra-violet variations, it will not heat up and sterilization will be effected without substantially increasing the temperature of the food product. Sterilization is enhanced since the outer tube 43, which is made of metal, has an interior polish to reflect the ultra-violet radiations.

Figure 5:
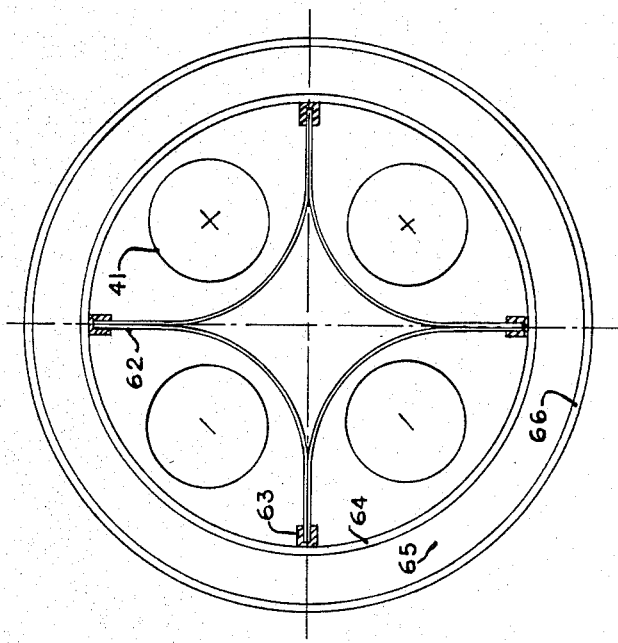
FIG. 5 is a cross-section of a multi-tube ultra-violet sterilizing coil.

For increased capacity, the ultra-violet cell can take the form shown in FIG. 5, wherein a multi-tube cell is shown in cross-section. Each ultra-violet tube 41 is partly surrounded by a transversely-curved reflector 62, for instance made of polished aluminum. The reflectors 62 are joined two by two by a non-scratch edge protector 63 engaging the inside surface of the quartz jacket 64, which is in turn spacedly surrounded by the outer tube 66, again made of metal with an interior surface polish. Obviously, the number of tubes and associated reflectors may vary to meet treatment requirements.

FIG. 6 shows a typical heat exchanger 3 which comprises an inner metal tube 71 surrounded by an outer metal tube 72 defining an annular space therebetween. The two tubes 71 and 72 are supported at their ends by two similar end cell bodies 73. One body 73 defines an inlet chamber 73 with its inlet port 75, while the other body 73 defines and outlet chamber 78 with its outlet port 79. The inner tube 71 is held in sealing engagement with the cell bodies 73 by means of watertight gaskets 76 held in place by screwed compression ring 77. The inner tube 71 protrudes from the end cell bodies 73 and is provided at its two ends with a coupling 80 for coupling to the piping of the apparatus. One path of the food product is through the inner tube 71, while the other path is through the annular space between the inner and outer tubes 71 and 72.

In the arrangement of FIG. 1, there are two series-connected infra-red heating cells 1 followed by one holding chamber 2, four series-connected heat-exchanger modules 3, two series-connected ultra-violet cells 4 and four series-connected heat exchangers 3 installed in the respective order.

The elements are all horizontally oriented and are secured side by side in a vertical plan to obtain a compact apparatus.

It is energically efficient, since the whole operation requires 40% less energy than pasteurization effected with conventional systems.

The entire apparatus may be mounted on casters, so that the unit may be transported to different areas of the same plant.

The control center 5 serves to control the operation of the three-way valves 89, the pump 6 at the required rate of flow as measured by the flow meter 7. Also, temperature sensors are provided and a warning light is installed to indicate whether or not the sterilizer cells 4 are in operation.

Infra-red radiations will heat rapidly the food product throughout its mass without overheating the tube walls in contact with the flowable food product.

Ultra-violet radiations are used to destroy the thermophyllic and thermoduric bacteria that survive pasteurization, and this makes up most of the residual bacteria count legally permitted in pasteurized products.

In the treatment cells, unabsorbed infra-red or ultra-violet energy will strike the highly-polished enclosures and will be mostly reflected back into the mass of the food product to be eventually absorbed by the same.

The low temperature sterilization assures the destruction of spores reproducing bacteria, while avoiding the cooked taste caused by high temperature treatment.

The holding chamber 2 downstream from the infra-red heating cells 1 serves to hold the product at the pasteurizing temperature for sufficient time to complete the pasteurization process.

When sterilizing a chemically-unstable liquid, the time exposure of the liquid of the ultra-violet rays must be carefully controlled, in order to prevent photo-chemical reactions which may have an adverse effect on flavour.

Preferably, operation of the infra-red emittng tubes is controlled by an electronic modulator located in the control center 5.

Referring to FIG. 7, after leaving the holding tank 2, the food product to be treated at first cooled down in the heat-exchanger section 3 to the heat suitable temperature for sterilization in the ultra-violet cells. Thereafter, the treated flowable food product is further cooled down in the second heat-exchanger stage 3. It is then discharged in cooled condition at 86, or further cooled in a cooling unit 87.

The holding chamber 2 is mainly required for milk, cream, syrup, fruit juice, alcohol. Some other products, like wines, do not need such a holding chamber.

Sterilization may not be required every time; therefore, the ultra-violet generating tubes 41 may be de-energized from the control center 5. A flashing warning signal will inform the operator that the sterilization is in operation. Sterilization by the ultra-violet cells is applicable to alcohol, beer, brandy, cider, coffee extract, cooking oil, egg mixture, egg white, fruit juice, honey, herring brine, molasses, must, peptic juice, syrup, tomato ketchup, vinegar, water, wine, whisky, yolk and similar products.

The apparatus can handle liquid, semi-liquid or even pulpous products. It is applicable to the partial aging of wines, brandy, whisky, etc. No change of color or taste has been found when treating fruit and vegetable juice.

If only sterilization is required, then the infra-red heating cells 1 may be simply cut off.

Figure 8:
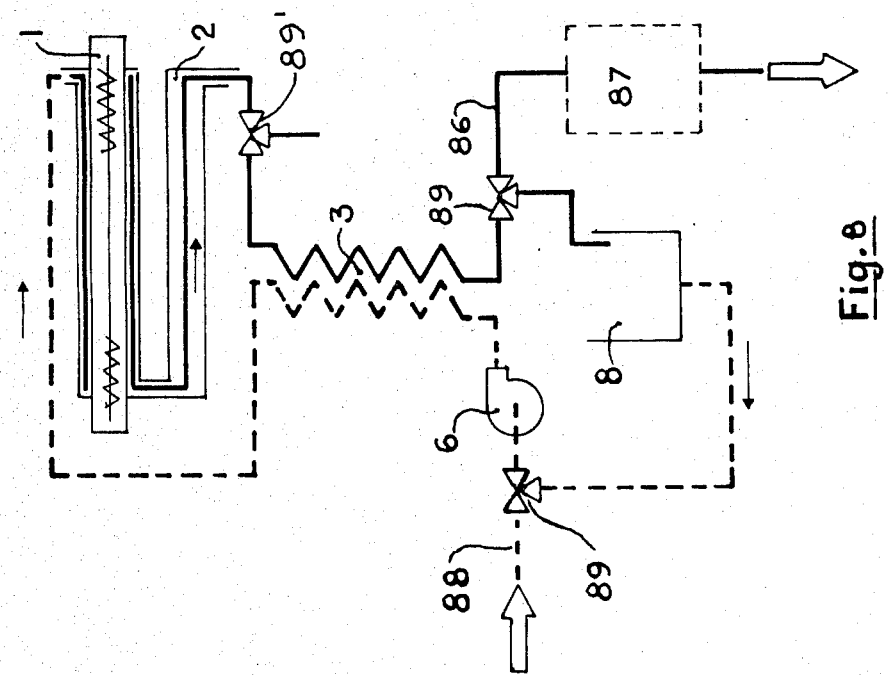
FIG. 8 is a flow diagram of a pasteurizing unit.

FIG. 8 shows a flow diagram of a pasteurizing unit without the sterilizing function. Otherwise, this unit is the same as in FIG. 7.

Figure 9:
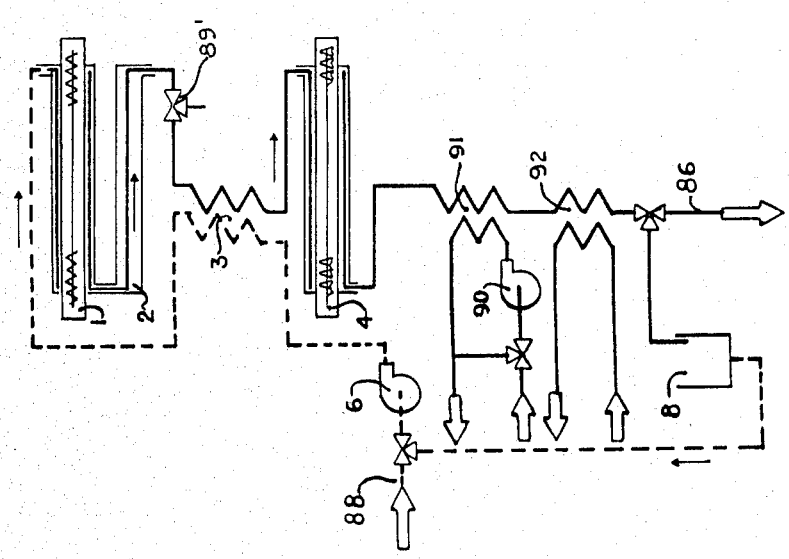
FIG. 9 is a flow diagram of a pasteurizing-sterilizing unit fitted with pre-cooling or pre-heating and cooling system.

FIG. 9 is a flow diagram of a pasteurizing and sterilizing unit fitted with a pre-cooling or pre-heating section and a cooling section. It is similar to the flow diagram of FIG. 7, with the addition of a pre-cooling and/or heating section 91 fed by cooling of heating liquid circulated by pump 90. There is another cooling section, indicated at 92.

Figure 10:
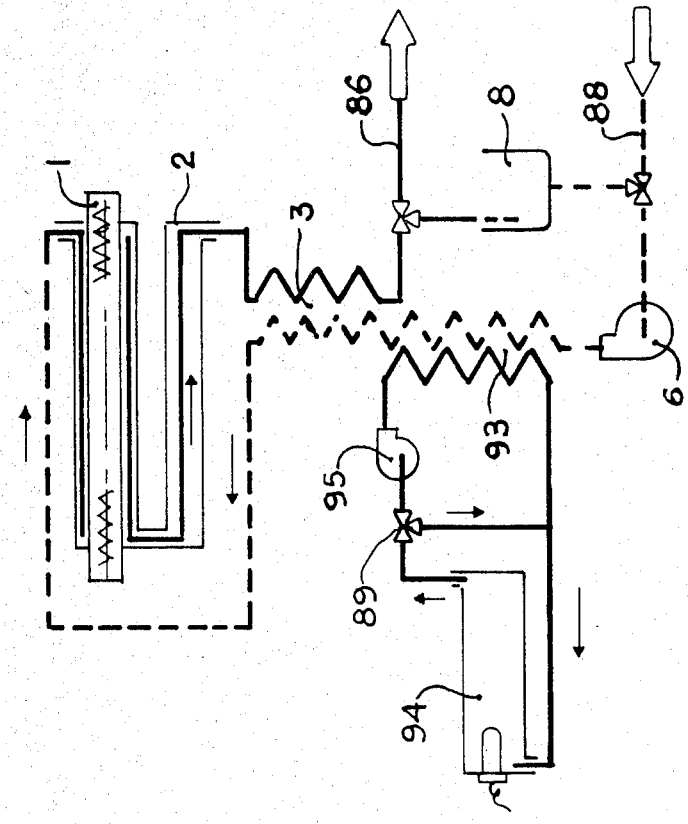
FIG. 10 is a flow diagram of a pasteurizing unit fitted with a pre-heating section.

FIG. 10 represents a flow diagramof a pasteurizing unit fitted with a pre-heating section. This is similar to the flow diagram of FIG. 8, with the addition of a pre-heating exchange section 93 fed with hot water from a hot water tank 93 and hot water circulating pump 95. This section 93 can be bypassed by operation of the three-way valve 89.

What I claim is:

1. An apparatus for sterilizing flowable food products, comprising an elongated cell including a radiation-emitting elongated member, end cell bodies supporting the ends of said member, a first quartz tube spacedly surrounding said member, said first quartz tube being transparent to said radiation, a second tube spacedly surrounding said first tube and defining a circulation space with said first tube, said second tube being opaque and reflective to said radiation, said first and second tubes being supported by said end cell bodies in fluid-tight engagement therewith, said end cells bodies each defining a first chamber in communication with said space and having a port for a flowable food product circulating through said space and a second chamber isolated from said circulation space, openable from the outside of said cell and providing an access into said first quartz tube to extract said radiation-emitting elongated member without disturbing the flow of food products through said cell.

2. An apparatus as claimed in claim 1, wherein said radiation-emitting elongated member constitutes a source of infra-red radiations.

3. An apparatus as claimed in claim 1, wherein said radiation-emitting elongated member constitutes a source of ultra-violet radiations.

4. An apparatus as claimed in claim 2, further including a holding chamber connected to the outlet of said cell, said holding chamber being a heat-insulated tube assembly having an internal free cross-sectional area larger thanthe cross-sectional area of the circulation space of said cell.

5. An apparatus for treating a flowable food product so as to kill microorganisms within said product, comprising an infra-fed heating cell, a holding chamber and an ultra-violet sterilizing cell serially connected in the named order, each cell comprising a central elongated radiation-emitting element, a first quartz tube spacedly surrounding said element and transparent to radiations emitted by said element, a second tube spacedly surrounding said first quartz tube and defining a circulation space with said first tube, said second tube is opaque and is reflective of said radiations, and bodies supporting the ends of said tubes and of said element in fluid-tight assembly, each body defining a first chamber surrounding said first quartz tube and a port for communication with said first chamber, the latter in communication with a circulation space between said first and first and second tubes, and a second chamber isolated from said circulation space, openable from the outside of said cell and providing an access into said first quartz tube to extract said radiation-emitting elongated element without disturbing the flow of food products through said cell, said holding chamber defining an elongated tubular member having heat-insulated walls and having a free circulation space, the cross-sectional area of which is larger than the circulation space of said cells, and tubing means serially connecting said cells and holding chamber.

6. An apparatus as claimed in claim 5, further including a first heat exchanger having a first path connected between said holding chamber and the outlet of said ultra-violet sterilizing cell, and a second path connected to the inlet of said infra-red heating cell for pre-heating the flowable product entering said last-named cell, and a second heat exchanger having a first path receiving the flowable product coming out of said ultra-violet sterilizing cell and a second path for circulating the untreated product prior to entering said first heat exchanger.

* * * * *